M. S. LYON.
Churn.

No. 214,413. Patented April 15, 1879.

Witnesses.
Chas. G. Page
Will R. Omohundro

Inventor
Marcus S. Lyon
by Myers &Co.
Attys

UNITED STATES PATENT OFFICE.

MARCUS S. LYON, OF ARMADA, MICHIGAN.

IMPROVEMENT IN CHURNS.

Specification forming part of Letters Patent No. 214,413, dated April 15, 1879; application filed January 15, 1879.

*To all whom it may concern:*

Be it known that I, MARCUS S. LYON, of Armada, in the county of Macomb and State of Michigan, have invented certain new and useful Improvements in Churns; and I do hereby declare that the following is a full, clear, and exact description of my invention, which will enable others skilled in the art to which it appertains to make and use the same, reference being had to the accompanying drawings, and to letters of reference marked thereon, which form a part of this specification.

This invention relates to churns, in which air is introduced into the cream within the churn by means of a hollow shaft of the rotary dasher, the dasher being provided with pivoted slats, which, during the rotation of the dasher, present their edges to the cream, so as to break the globules of the same.

The improvement consists in a perforated false bottom loosely mounted upon the shaft of the dasher, and provided with certain spring-pieces, in combination with said shaft, having projecting arms, with which the spring-pieces engage, as hereinafter more fully described, and set forth in the claims; also, in the combination with the pivoted slats of dasher, arms provided with springs having side wings, adapted to embrace said arms, as hereinafter more definitely set forth and claimed.

Figure 1:
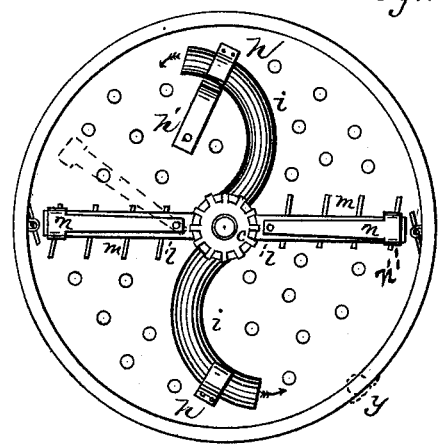
Figure 2:
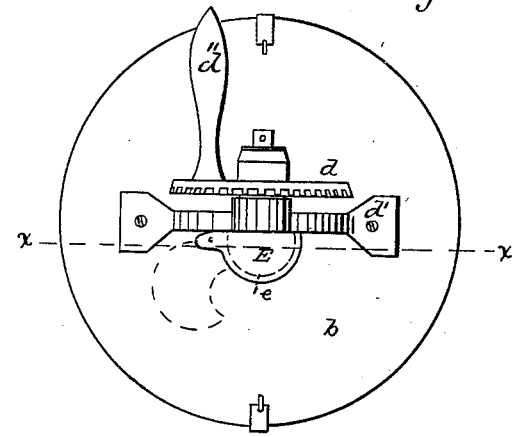
Figure 3:
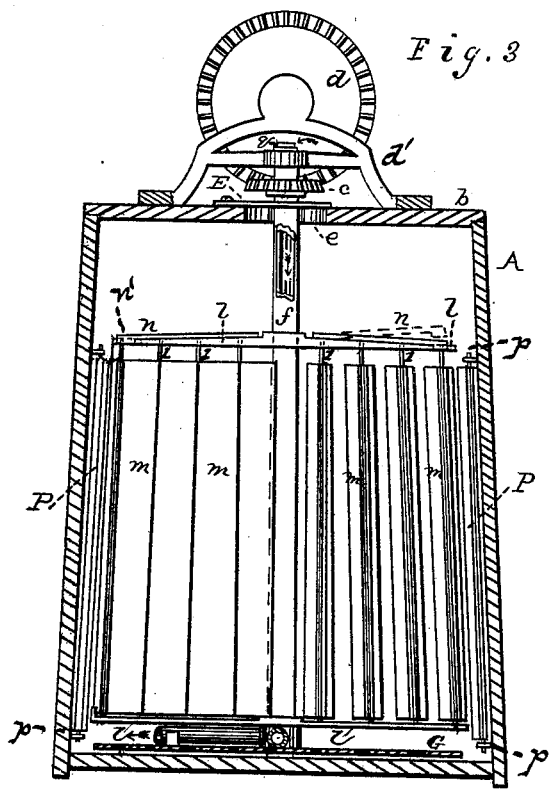
Figure 5:
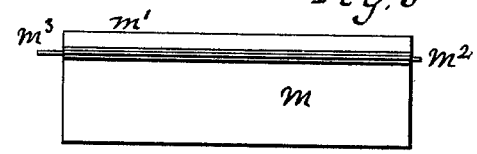
Figure 6:
Figure 4:
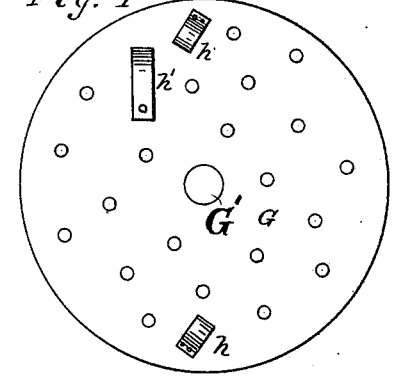

In the drawings, Figure 1 is a top or plan view of the churn with its cover removed. Fig. 2 is a like view with the cover secured thereon. Fig. 3 is a vertical section taken on a plane indicated by the line $x$ $x$, Fig. 2. Fig. 4 shows the false bottom removed from the churn and detached from the dasher-arms. Fig. 5 is an enlarged view of a slat from the dasher. Fig. 6 shows one of the slats or wings, which, in operation, are pivoted upon the inner side of the churn, detached therefrom.

Referring by letter, A shows the body of a churn, and $b$ its cover, which is secured thereto by any ordinary form of catches, straps, or hooks and eyes.

The axis of the gear-wheel $d$ is journaled in the upper portion of a cast-metal frame, $d'$, which is secured upon the cover in any suitable way; and this gear-wheel $d$ intermeshes with a smaller gear-wheel, $c$, upon the shaft $f$ of the rotary dasher, so that when the wheel $d$ is operated by means of its handle $d''$ a rotary motion will be imparted to the dasher, as is usual in churns of this class.

In this churn I employ the hollow shaft, with hollow arms radiating therefrom at its lower extremity, so that during rotation of the same through the cream within the churn a vacuum will be formed in the cream at the end of each arm, and thereby a current of air induced to pass down through the shaft, and thence out into the cream through the arms $i$ $i$. Air thus introduced into cream either raises or diminishes the temperature of the cream, according to the temperature of the external air, and is a matter of judgment with the manufacturer or dairyman.

The shaft $f$ passes through an opening in the cover, and should be properly stepped in the bottom of the churn. The opening $e$ in the cover is made of such size that the cover may be lifted off the churn and up from the shaft without disturbing said shaft. This, it will be seen, can readily be effected by making the opening $e$ larger than the gear-wheel $c$.

To maintain the shaft in position its upper end sits loosely in a portion of the cast frame or support $d'$; and to cover opening $e$, a cover, E, is pivoted to the cover $b$. This cover E may be swung round from over the opening $e$, when desired, as shown in dotted lines, Fig. 2.

To the shaft $f$ I secure two horizontal bars, so as to form upper and lower arms, $l$ $l$, for carrying the slats. The construction of these slats which I employ will be more plainly indicated by a detached slat. (See Fig. 5 in the drawings.) By this it will be seen that the rod which constitutes the axis of the shaft is not secured thereto along one edge, but about half-way between one edge and the center of the slat. In this way the slats $m$ in Figs. 1 and 3 will, while the dasher is rotated through cream in the churn, assume the positions shown in Fig. 1, the narrower portion $m^1$ (see Fig. 5) naturally being the one presented to the cream and in front, upon the principle of a vane. The edges of these slats, which are arranged as shown, cut and break the globules of cream and work in an effective manner.

The projecting lower ends, $m^2$, (see Fig. 5)

of the rods constituting the axes of the slats are stepped in the arms $l\ l$ of the lower cross-bar of the dasher, while the corresponding upper ends, $m^3$, just about pass through openings formed through the arms $l\ l$ of the upper cross-bar. In this way, when it is desired to remove every other slat, as when the cream is very thick and fewer slats are needed, the operator can readily do so by raising a slat so that the lower end of its rod clears the lower arm of the cross-bar, and then, by lowering it until the upper end of the rod is freed from the upper arm of the upper cross-bar, the slat can be taken away from the dasher.

In Fig. 3 I have shown all of the slats to the left of the shaft as being lapped together. This happens when the motion of the dasher is reversed, so as to gather the butter. The slats to the right of the shaft in this figure I have illustrated as being nearly in the position of the slats in Fig. 1. By turning the dasher in this way backward and forward the slats will all open, and then close, according to the direction of rotation.

To hold these series of slats down during operation, I pivot to the upper arms, $l\ l$, of the cross-bar spring-pieces $n$, their pivotal points being near to the shaft $f$, as shown in Figs. 1 and 3. These pieces $n$ enlarge or widen toward their outer ends, and at said ends are formed with side wings $n'$, which embrace the sides of the arms $l\ l$. When the slats are to be removed, raise the spring-piece until its side wings $n'$ clear the arm; then swing it round, after which a slat or slats may be removed, as before described.

P P are side wings or slats, constructed somewhat like the slats of the dasher. The rod forming the axis of such slat runs through the center instead of to one side of the same, and the slat decreases in width toward one end, so as to correspond to the shape of the churn, which has a somewhat conical shape. This form prevents the said side slat from stopping the movements of the dasher. These slats are usually employed to prevent or check the too rapid rotation of a current of cream, which otherwise would occur by the rotation of the dasher, and thereby detract from the full effect of the dasher-slats. The projecting ends of the rods of these side slats are set into staples $p$, so that the slats can be removed when desired. This may be done by making one end of the rod longer than the other, and then freeing the slat in a manner similar to that employed in connection with the removal of slats $m$. Whichever way the current rotates, one edge of slats P will be against the inner side of the churn, and thereby an opposing surface is presented by the projecting other side of said slat. This will be evident from the fact that the slat will have a tendency to revolve in its bearings, such revolution being only partial, and being checked by the nearness of the slat to the inner side of the churn.

G is a perforated false bottom. The shaft $f$ passes through an opening, $G'$, in the same. This bottom is connected to the arms $i\ i$ by two stationary lugs or stationary curved spring-pieces, $h\ h$, and a movable piece, $h'$, which is pivoted to bottom G.

When the dasher and bottom are removed the bottom G performs the function of the usual strainer. It may, however, when desired, be left within the churn and the dasher alone removed; or the said dasher and bottom may be first taken out from the churn, and the bottom then detached.

These pieces, as shown in Fig. 1, clasp over the arms $i\ i$ when the false bottom G is suspended within the churn. When it is to be detached, the piece $h'$ will be turned round, as shown in Fig. 4.

What I claim is—

1. The perforated false bottom G, loosely mounted on shaft $f$, and having the spring-pieces $h\ h'$, in combination with the shaft $f$, provided with projecting arms $i\ i$, as specified.

2. The combination of the pivoted slats $m\ m$, with the arms $l\ l$, provided with the springs $n$, having side wings $n'$, embracing said arms, substantially as shown and set forth.

In testimony that I claim the foregoing as my own I affix my signature in presence of two witnesses.

MARCUS S. LYON.

Witnesses:
E. A. JENNINGS,
CHAS. H. CHAPMAN.